United States Patent [19]
Hermanson

[11] Patent Number: 4,885,664
[45] Date of Patent: Dec. 5, 1989

[54] SHEATHED STRING OF CHRISTMAS TREE LIGHTS

[75] Inventor: Terry Hermanson, New York, N.Y.

[73] Assignee: Mr. Christmas Incorporated, New York, N.Y.

[21] Appl. No.: 303,303

[22] Filed: Jan. 30, 1989

[51] Int. Cl.[4] F21P 1/02; B29C 53/00

[52] U.S. Cl. 362/123; 362/249; 362/806; 264/281

[58] Field of Search 362/123, 806, 127, 249, 362/252, 234, 239, 267, 122, 235, 240; 428/7, 76; 264/281, 285, 339; 206/400, 410, 419, 420, 421, 328, 330; 229/87 H, 87 R

[56] References Cited

U.S. PATENT DOCUMENTS

| | | | |
|---|---|---|---|
| 3,035,163 | 5/1962 | Prumgardhen | 362/123 |
| 3,499,072 | 3/1970 | Helling et al. | 264/281 |
| 3,714,414 | 1/1973 | Sternius | 362/806 |
| 3,894,225 | 7/1975 | Chao | 362/249 |
| 4,107,767 | 8/1978 | Auquetin | 362/249 |
| 4,271,458 | 6/1981 | George, Jr. | 362/806 |
| 4,283,362 | 8/1981 | Gold | 264/281 |
| 4,521,839 | 6/1985 | Cook et al. | 362/249 |
| 4,581,687 | 4/1986 | Nakanishi | 362/806 |
| 4,597,033 | 6/1986 | Meggs et al. | 362/62 |
| 4,607,317 | 8/1986 | Lin | 362/124 |

*Primary Examiner*—Ira S. Lazarus
*Assistant Examiner*—D. M. Cox
*Attorney, Agent, or Firm*—Karl W. Flocks

[57] ABSTRACT

A flexible thermoplastic sheath for a string of Christmas tree electric lights which is generally tubular and formed with a set cross sectional shape corresponding to the spiral of Archimedes so that when the ends of the section of the spiral are forced apart and then released the memory of the set sheath will come into play and the cross section will once again resume the shape of the spiral.

5 Claims, 1 Drawing Sheet

SHEATHED STRING OF CHRISTMAS TREE LIGHTS

This invention relates to the decoration of Christmas trees and more particularly to a longitudinally extending sheath for a string of spaced lights which sheath normally has a cross-sectional shape in the form of the spiral of Archimedes.

BACKGROUND

Prior to the instant invention there has appeared a string of lights adapted to be used on a truck or a boat and such prior strings have been encased in flexible translucent tubes having a closed circular cross-section. When a light in such prior strings needed to be replaced or otherwise needed attention, it was necessary to remove the string from the tubular casing or at least substantially remove it longitudinally. Such procedure was both time consuming and costly. It is the object of the present invention to improve such prior structures and incorporate the spiral of Archimedes into the cross-section of a longitudinally extending transparent or translucent flexible sheath.

It is another object of the invention to cut down the time needed to gain physical access to one of the spaced lights and to gain such access without cutting the sheath or pulling the string out of the sheath longitudinally.

It is still another object of the invention to use a sheath with a memory so that when it is opened laterally or transversely and after a place on the string of lights is examined by physical contact or after it is worked on, then it will automatically close, utilizing the characteristic of its memory.

Still other objects and advantages will become apparent after reference is made to the following description and disclosure.

DETAILED DESCRIPTION

Figure 1:
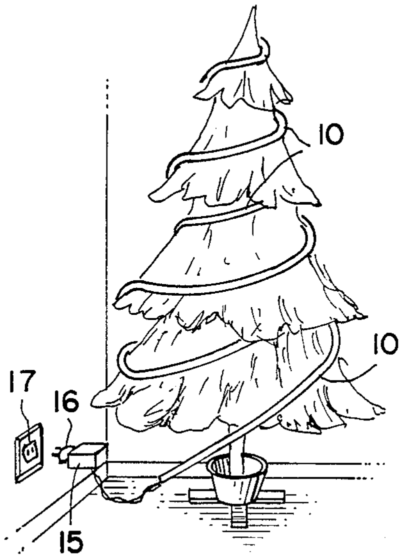
FIG. 1 is a view in perspective of a Christmas tree having decoratively arranged thereon a sheathed string of lights connected to an electrically actuated music box ready to be connected to a source of electricity.
Figure 4:
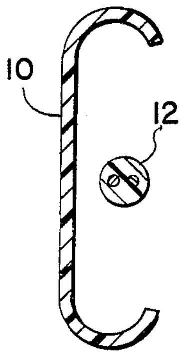
FIG. 4 is a view in cross-section of the sheath in open position and is taken along line 4—4 of FIG. 3 and looking in the direction of the arrows.
Figure 5:
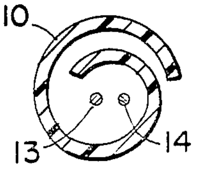
FIG. 5 is a view in cross-section of the sheath in closed position taken along line 5—5 of FIG. 3 and looking in the direction of the arrows.
Figure 2:
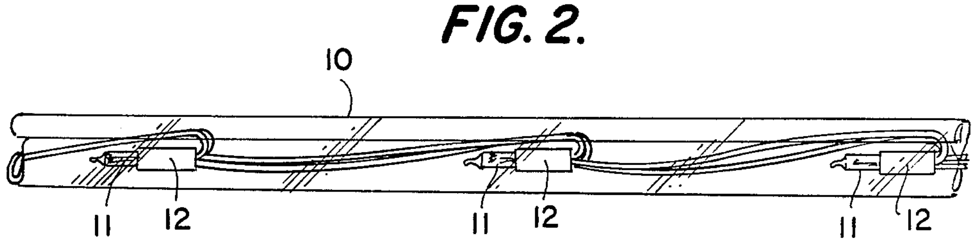
FIG. 2 is a view in elevation of a fragment of a sheathed string of lights.
Figure 3:
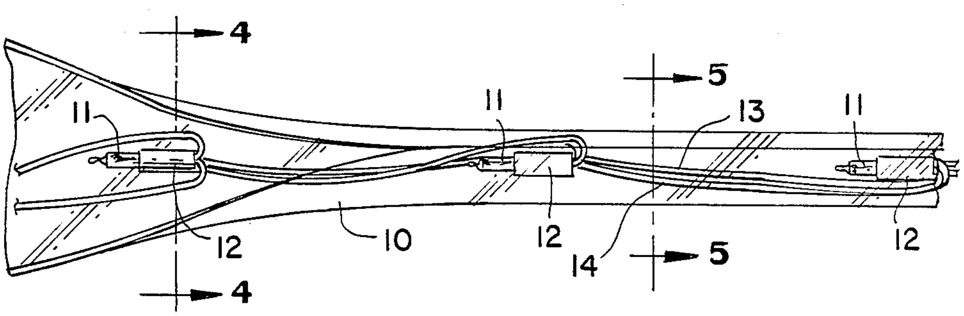
FIG. 3 is an enlarged view of a fragment with a portion of the sheath in open position to expose a light socket and a light bulb.

Referring to the drawings, the sheath 10 encases the twisted wires 13 and 14 of the electric circuit which services the spaced electric lights 11 engaged by sockets 12.

This electric circuit is connected to the electrical music box which in turn is connected to a male plug 16 adapted to mate with a power source having a female electric socket 17.

The sheath 10 is preferably formed of flexible polymeric material such as, for example, polyvinyl chloride or polyetheline or the copolymer of vinyl and vinylidene chloride and sometimes called "saran".

The normal cross section of the sheath 10 is in the form of the spiral of Archimedes. When the two opposite ends of the spiral cross-section are spread apart then the cross-section takes a form corresponding to the letter "C" so that the twisted wires 13 and 14 are exposed and a particular socket 12 and light bulb 11 may be exposed. This feature of the sheath is a significant time saver particularly when a bulb or socket connected to wires 13 and 14 needs replacement or attention.

The sheath 10 may be extruded in the cross-sectional shape of the spiral of Archimedes or it may initially be formed extruded or rolled as a flat tape and then heated and formed into the cross-sectional shape of the spiral of Archimedes and then cooled to set the polymeric material with a memory so that when it is pulled apart by its set cross-sectional opposite ends and then released, the characteristics of "memory" will take over and the sheath will once again assume its normal geometric form.

The electric music box 15 by itself is of a heretofore known construction including a transducer to produce sound and a chip including a musical recording and conventional switching mechanism so that when the plug 16 is mated with the socket or receptacle 17 or power source, the beat of the music from the box 15 and the switching mechanism therein turns on and off, in timely fashion, the spaced lights 11 on the string encased within the sheath 10.

Although preferred embodiments have been described, it is apparent that changes and modifications can be made and equivalents substituted without departing from the invention.

What is claimed is:

1. In a string of lights for a Christmas tree, the combination comprising a light transmitting generally tubular flexible sheath, an electric circuit enveloped by said sheath, a series of electric light sockets connected to said circuit at periodically spaced intervals, individual electric light bulbs in and received by said periodically spaced sockets, said sheath being a flexible membrane, having a set cross section in the shape of the spiral of Archimedes with the ends of the cross-section overlapped so that the sheath is held in place by the force of the set spiral of Archimedes and being capable of being forced to spread apart at any place along its length so as to expose a particular light or a particular light bulb socket and when so spread apart the two cross-sectional ends no longer overlap whereby a light bulb may be readily replaced without removing the entire or a substantial part of the circuit from the sheath, said sheath of said cross-section having a memory so that, when the spreading force is released, the spread apart plastic sill remember to return to the shape of the spiral or Archimedes.

2. The structure recited in claim 1, a music box connected to said electric circuit, said music box including a music producing unit and a switch device with on and off positions and means responsive to the beat of the music to actuate said switch device from on to off position and from off position to on position and a male plug associated with said music box so that electric power from a power source can activate the music box to make music with a beat in time with the sheathed lights.

3. The structure recited in claim 1 wherein the sheath is formed of a flexible thermoplastic polymer.

4. The structure recited in claim 3 wherein the sheath is extruded in the cross-sectional shape of a spiral of Archimedes.

5. The structure recited in claim 3 wherein the sheath is made from a heated flat extruded tape into a generally spiral cross section and then cooled to set the shape of the sheath and whereby it may be spread apart with force and released at will so that its memory will take over and the sheath will resume its set spiral shape.

* * * * *